Dec. 1, 1964 F. J. T. DOW ETAL 3,159,823

MAGNETIC DISC STORAGE DEVICE

Filed Feb. 28, 1964 4 Sheets-Sheet 1

INVENTORS
FREDERICK J.T. DOW
RICHARD E. MORLEY
WILLIAM J. GORMAN

BY

Philip McFarland
ATTORNEY

INVENTOR.
FREDERICK J.T. DOW
RICHARD E. MORLEY
WILLIAM J. GORMAN

BY Philip J McFarland
ATTORNEY

MAGNETIC DISC STORAGE DEVICE

INVENTOR.
FREDERICK J. T. DOW
RICHARD E. MORLEY
WILLIAM J. GORMAN
BY
Philip J. McFarland
ATTORNEY Dec. 1, 1964 F. J. T. DOW ETAL 3,159,823

MAGNETIC DISC STORAGE DEVICE

Filed Feb. 28, 1964 4 Sheets-Sheet 4

INVENTOR.
FREDERICK J. T. DOW
RICHARD E. MORLEY
WILLIAM J. GORMAN
BY
Philip J McFarland
ATTORNEY 3,159,823
MAGNETIC DISC STORAGE DEVICE Frederick J. T. Dow, North Billerica, Richard E. Morley, Bedford, and William J. Gorman, Billerica, Mass., assignors to Laboratory for Electronics, Inc., Boston, Mass., a corporation of Delaware Filed Feb. 28, 1964, Ser. No. 348,223
6 Claims. (Cl. 340—174.1)

This invention pertains generally to magnetic recorders and particularly to recorders of such type wherein information is recorded in tracks on moving magnetic recording mediums.

The so-called "mass memory" in which at least tens of millions of bits of information may be recorded is well known in the magnetic recording art. At the present time, either "drum" or "stiff disc" types of recorders are the only commercially available types of mass memories. While either type is quite satisfactory for use in fixed installations where environmental conditions may be controlled, great care must be taken in design and operation to attain satisfactory results. In particular, it is extremely important to avoid vibration and extreme temperature changes which may cause catastrophic failures.

When large amounts of information are stored on tracks in the form of binary words, it becomes somewhat of a problem to record and/or retrieve individual ones of such words on demand. On the one hand, economy dictates that the apparatus be as simple as possible while, on the other hand, speed of recording and/or retrieving demands rather sophisticated peripheral equipment. Consequently, presently known drum and disc type mass memories usually balance off the antithetical requirements of economy and speed to provide a mass memory which is fast enough to be usable and inexpensive enough to be affordable. For example, many known types of mass memories use a magnetic transducer which may be moved from one track to another to reduce the cost and complexity of the apparatus. Obviously, however, such an approach increases access time and requires a complex mechanical control system to effect precise positioning of the magnetic transducer with respect to the tracks.

It has been suggested that environmental problems encountered when drums or stiff discs are used in a mass memory may be solved by using a species of the "flexible disc" recorder, described in U.S. patent application Serial No. 97,987, filed March 21, 1961, and assigned to the same assignee as this application. That is, it has been suggested that a single shaft be adapted to drive a plurality of flexible discs, each one of the discs being disposed adjacent to a stabilizing plate so as to be constrained to rotate at a substantially fixed distance from such plate. Thus, when magnetic transducers, either embedded in the stabilizing plate or mounted on any known positioning mechanism, are energized, information may be recorded and subsequently read.

It has been found, however, that simply ganging known flexible disc recorders does not produce a mass memory which is overall significantly better than known mass memories. The weight and size of peripheral equipment, as a drive motor, and the difficulties involved in assembling a plurality of flexible discs and stabilizing plates so that the spacing between each disc and its associated plate combine to make ganging of known flexible disc recorders feasible only in special circumstances.

Therefore, it is a primary object of this invention to provide a general purpose mass memory utilizing a plurality of flexible discs adapted to magnetic recording.

Another object of this invention is to provide a mass memory utilizing a plurality of flexible discs adapted to magnetic recording, which memory is substantially lighter than known mass memories.

Still another object of this invention is to provide a mass memory utilizing a plurality of flexible discs adapted to magnetic recording, which memory may be operated in environments wherein vibrations, shocks and temperature prevent the use of known drums and stiff discs.

Still another object of this invention is to provide an improved flexible disc magnetic recorder wherein access time to any desired tracks is minimized.

A still further object of this invention is to provide an improved disc recorder in which the location of tracks is fixed with reference to the gaps of magnetic transducers.

These and other objects of the invention are attained by providing a flexible disc recorder built by assembling modules, each of which comprises two flexible discs, stabilizing plates and appropriate magnetic transducers, around a common shaft. A magnetic clutch between each module and the common shaft is also provided so that the discs in each module may be rotated by a motor driving the shaft, independently of the discs in the remaining modules. For a more complete understanding of the invention, including what constitutes appropriate magnetic transducers, reference is now made to the following detailed description of a preferred embodiment of the invention and to the drawings in which:

Figure 1:
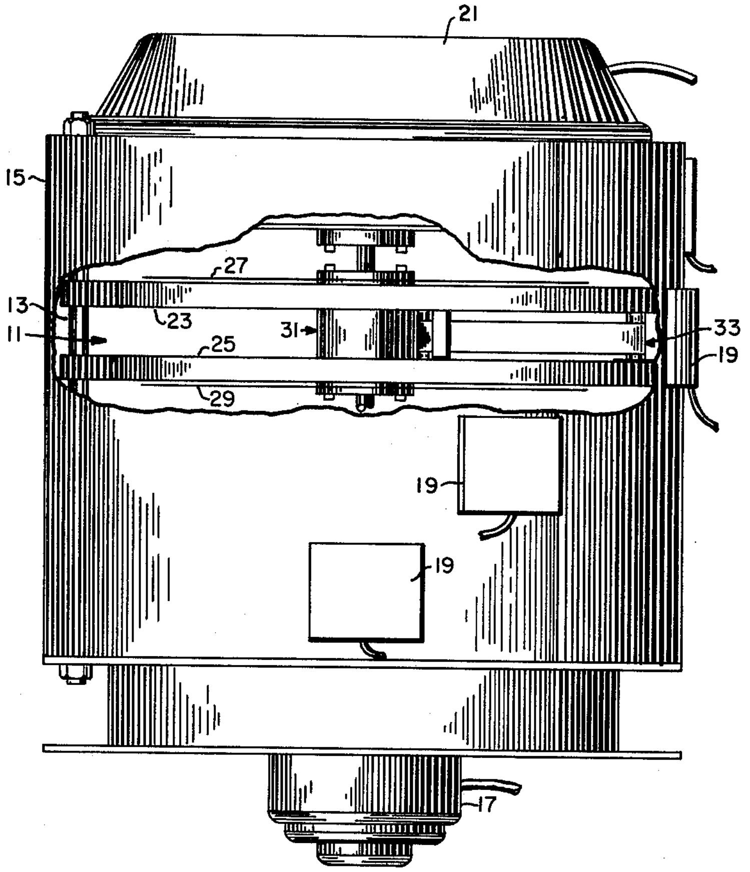
FIG. 1 is a simplified perspective view of a magnetic recorder according to the invention, the view being partially broken away to show some detail of a module.

Referring now to FIG. 1, it may be seen that a mass memory according to a preferred embodiment of the invention comprises a plurality of memory modules 11 rigidly connected together by a plurality of mounting posts, one of which is shown at 13. The modules are encased in a cover 15 to which is connected an electric motor 17, a plurality of transducer positioning units 19 and appropriate read/write amplifier 21. Each memory module 11 comprises a first and a second stabilizing plate 23, 25, a first and a second flexible memory disc 27, 29, drive mechanism 31 for rotating the flexible memory discs 27, 29, and a transducer coil positioning mechanism 33 co-acting with a transducer positioning unit 19. The details of construction of a memory module 11 are shown in the later figures. It is sufficient here only to note that the stabilizing plates 23, 25 are fabricated from non-magnetic materials having pole pieces shown in FIGS. 2 and 4 embedded therein so as to complete a magnetic half from the individual transducer coils in the transducer coil positioning mechanism 33. Each transducer positioning unit 19 is connected through an appropriate cable to a control unit shown in FIG. 3. Thus, when the electric motor 17 is actuated from a source (not shown) a drive shaft 35 is rotated so thereby causing the flexible memory discs 27, 29 to rotate in close proximity to the stabilizing plates 23, 25 for the reasons described in more detail in U.S. patent application Serial No. 97,303, filed March 21, 1961, which application is assigned to the same assignee as this application. The transducer coils in the transducer coil positioning mechanism 33 are positioned to co-act with certain ones of the pole pieces embedded in the stabilizing plates 23, 25. Consequently, when the coils are energized (either by signals passed from the read/write amplifier 21 or by changes in the magnetic state of individual portions of the flexible memory discs 27, 29) information is either written into the flexible memory discs 27, 29 or read from such discs. It should be noted here that it is preferred, for reasons that will become clear hereinafter, that reading and writing of information be accomplished in parallel that the number of transducer coils in the transducer coil positioning mechanism 33 be equal to the number of bits in any word to be recorded or read (plus, of course, transducer coils in sufficient number to provide parity and check bits as desired). In other words, it is preferred that the first bit in a word be recorded on one track, second bit on the second track and so on.

Figure 2:
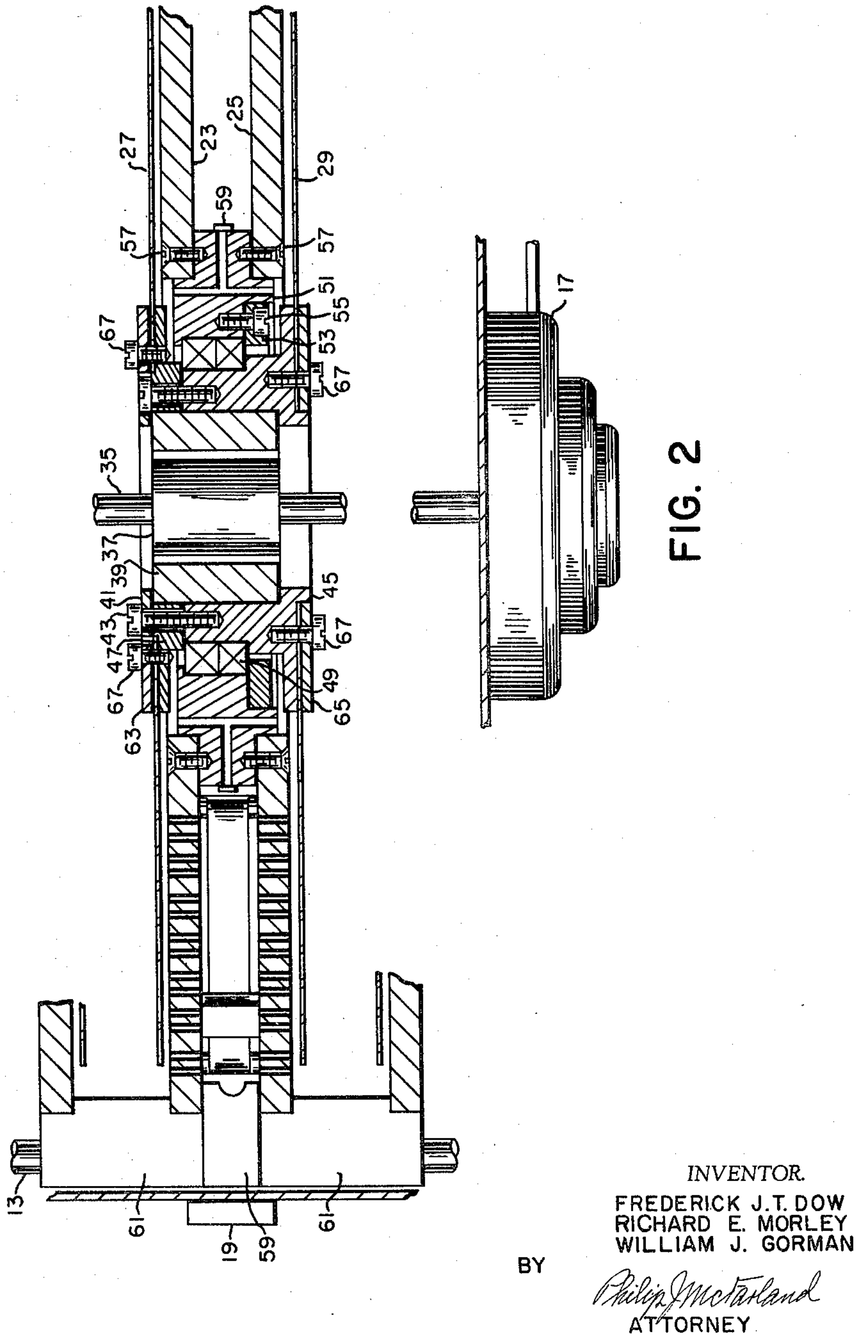
FIG. 2 is a cross-sectional view of a module of FIG. 1, showing in particular the mechanical structure of such module and illustrating a preferred arrangement for track selection.

Referring now to FIG. 2, which is a cross-sectional view of a memory module 11, it may be seen that there is no mechanical constraint on movement of the drive shaft 35 in a manner perpendicular to the plane of the stabilizing plates 23, 25. The absence of any constraint is due to the fact that a magnetic clutch is used to connect the drive shaft 35 with the moving flexible memory discs 27, 29. The magnetic clutch comprises an inner magnet 37 affixed in any known manner through the drive shaft 35 and an outer magnet 39 annular in shape surrounding inner magnet 37 and held in position with respect to the stabilizing plates 23, 25. It should be noted here that the inner magnet 37 and the outer magnet 39 may be formed and magnetized so as to have a plurality of opposing poles disposed around their peripheries. The support for the outer magnet 39 comprises a retaining ring 41 screwed as by a plurality of screws, one of which is shown at 43 to a block 45 to a ring 47. The block 45 and subsequently the elements attached thereto are supported on the inner race of a pair of annular ball bearings 49. The outer races of the annular ball bearings 49 in turn are supported by a block 51 and a retaining ring 53 which are connected together by a plurality of screws one of which is shown at 55. The block 51 in turn is shaped so as to fit between the stabilizing plates 23, 25, as shown and is connected to such plates by a plurality of screws 57. The block 51 further is drilled so as to provide passages for air to pass from the space between the stabilizing plates 23, 25 to the space between each of the stabilizing plates and its associated flexible memory disc 27, 29, there being an orifice valve 59 mounted on the block 51 as shown so as to control the rate at which air may flow between the two spaces. The stabilizing plates 23, 25 are supported at their outer peripheries by appropriately shaped spaces 61, 62. The flexible memory discs 27, 29 are clampel respectively between the ring 47 and a retaining ring 63, 65 by means of a plurality of screws 67.

It may be seen from the foregoing that the stabilizing plates 23, 25 are so joined as to be effectively a single plate insofar as resistance to vibration is concerned, but at the same time are spaced one from the other so as to permit mechanism to be disposed in such space. Further, it may be seen that the flexible memory discs 27, 29 are so mounted as to be rotated in accordance with the rotation of drive shaft 35, but are at the same time mechanically decoupled from such drive shaft so that each memory module 11 may be adjusted independently of the others and operated independently of the others. Thus when the electric motor 17 is energized, the drive shaft 35 is rotated and the flexible memory discs 27, 29 in turn are rotated through the just described mounting mechanism. When the flexible memory discs 27, 29 are rotated air is drawn from the space between the stabilizing plates 23, 25 through the orifice valve 59 and the passages in the block 51. This air then passes outwardly through the space between the flexible memory discs 27, 29 and the stabilizing plates 23, 25 and returns to the space between the stabilizing plates 23, 25 around the outer edges thereof. When an equilibrium exists between the fluid centrifugal and internal forces acting on the flexible memory discs 27, 29, the disc assumes a shape of a surface revolution and a stable spacing between the disc and the stabilizing plates 23, 25 results. As noted hereinbefore a plurality of whole pieces (shown as dotted vertical lines) extending through the stabilizing plates 23, 25 are embedded in the plates.

Figure 3:
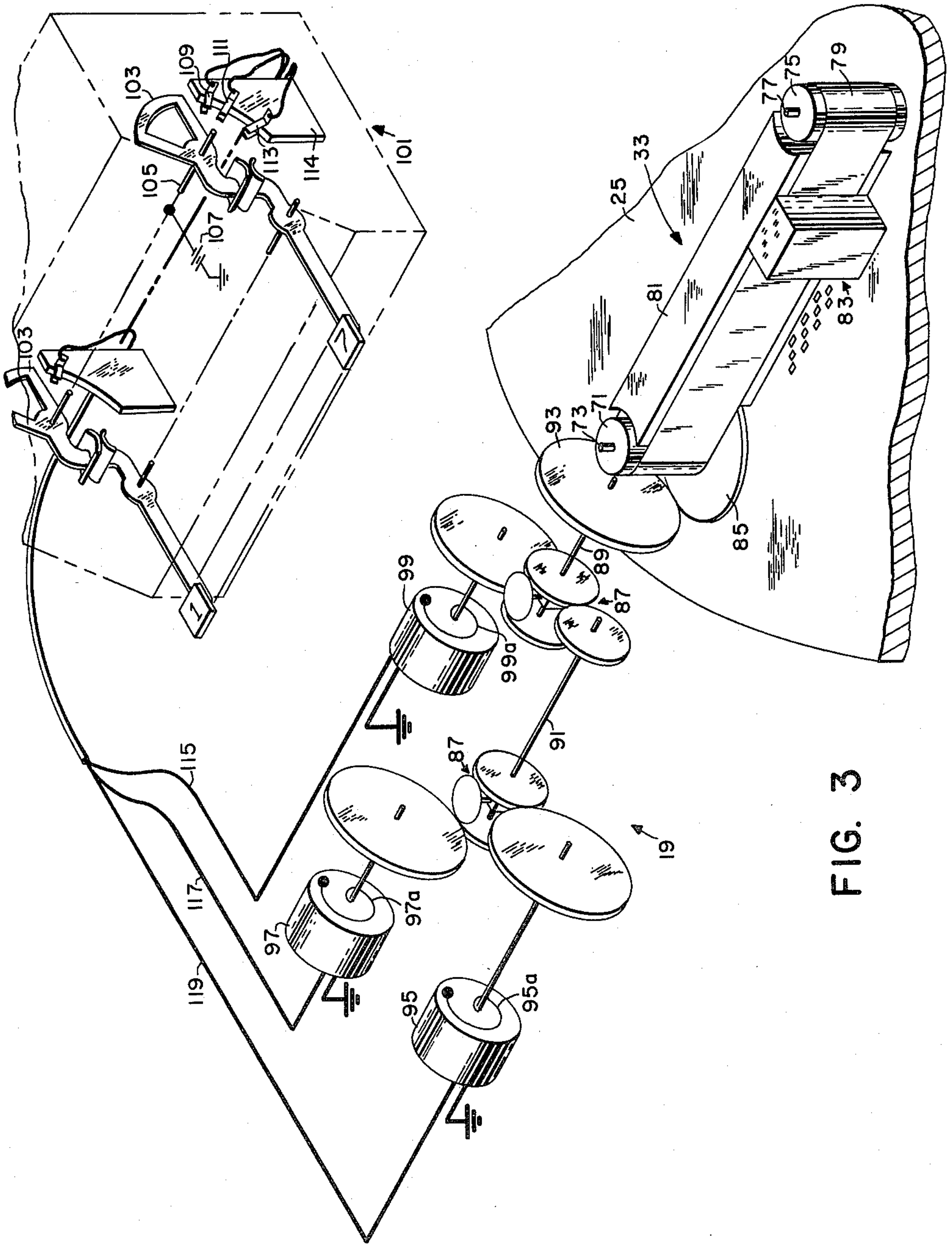
FIG. 3 is a partially schematic representation of a control system for positioning the magnetic transducer of FIGS. 1 and 2.

Referring now to FIG. 3, it may be seen that the transducer coil positioning mechanism 33 comprises: a driven capstan 71 integrally attached to a shaft 73 which is rotatably mounted between the stabilizing plates 23, 25; an idler capstan 75 integrally attached to a shaft 77 rotably mounted between the stabilizing plates 23, 25; a belt 79 supported by the capstans 71, 75 and held in position thereon by a spacer 81; a transducer coil assembly 83 affixed in any convenient manner to the belt 79 and a gear 85 integrally attached to the shaft 73. Thus it may be seen that, when the gear 85 is rotated, the shaft 73 is rotated, thereby moving the driven capstan 71 and the belt 79 and the transducer coil assembly 83. The motion of the transducer coil assembly 83 is, in the illustrated embodiment, radial of the stabilizing plates 23, 25. Further, according to the preferred embodiment of the invention, the gear 85 is moved through selected predetermined arcs, thereby finally causing the transducer coil assembly 83 to assume predetermined positions along its path of travel. The motion of the gear 85 may be controlled by mechanism consisting of a plurality of differential gear assemblies 87. It should be noted in passing that, for simplicity of explanation, only three differential gear assemblies and the actuating mechanism therefor have been illustrated in FIG. 3. As a result the transducer coil assembly according to the illustrated embodiment of the invention may be positioned only in any one of 7 selected positions (including an original position) depending upon the manner in which the differential gear assemblies 87 are energized. Obviously, however, if it is desired that the number of desired positions of the transducer coil assembly 83 is greater or less than seven, the number of differential gear assemblies 87 may be increased or decreased as required. Each of the differential gear assemblies comprises a first and a second driving gear and a planetary gear. These gears are shown in schematic form in FIG. 3, it being understood that in a working device each one of the differential gear assemblies 87 would include appropriate mounting shafts and cover elements. The output shaft 89, 91 of each of the differential gear assemblies 87 is rotated by an amount equal to the sum of the angular movement of each driving gear. In the illustrated example, then, the angular movement of the output shaft 89 (and the corresponding movement of a gear 93 affixed to such shaft) varies as different ones of three solenoids 95, 97, 99 are energized. The gear 93 in turn causes the gear 85 to rotate a corresponding amount, thus turning the driven capstan 71 to move the belt 79 and the transducer coil assembly 83.

The solenoids 95, 97, 99 preferably are identical, being Ledex Rotary Solenoids manufactured by G. H. Leland Inc. of Chicago, Illinois. A "zero-set" spring 95*a*, 97*a*, 99*a* is connected as shown to each solenoid 95, 97, 99 so that when the solenoids 95, 97, 99 are not energized, each driving gear in each differential assembly 87 assumes a predetermined "zero" position. The transducer coil assembly 83 is then positioned adjacent to the driven capstan 71. If the gear ratio of the gearing between each solenoid 95, 97, 99 and its cooperating differential assembly 87 differs, then the motion finally imparted to the transducer coil assembly 83 will differ as each solenoid 95, 97, 99 is energized. For example, in the illustrated case, the gear ratio between solenoid 95 and its differential gear assembly 87 may be set so that the transducer coil assembly 83 moves one-half the distance between the "zero" position adjacent to the driven capstan 71 and a position adjacent to the idler capstan 75; the gear ratio between solenoid 97 and its associated differential gear assembly 87 may be set to move the transducer coil assembly 83 one-quarter of such distance; and, the gear ratio between solenoid 99 and its associated differential gear assembly 87 may be set to move the transducer coil assembly 83 one-eighth of such distance.

From the foregoing, it may be seen that it is necessary to energize the solenoids 95, 97, 99 sequentially according to some kind of a program in order finally to position the transducer coil assembly 83 as desired. A position selector mechanism 101 may be used to accomplish the desired sequential energization of the solenoids 95, 97, 99. It should be noted, however, that in practice of this invention, illustrated programmer would be almost always replaced by a computer so that the solenoids 95, 97, 99 would be actuated automatically whenever it is desirable to move the transducer coil assembly 83.

The position selector mechanism 101 comprises a plurality of key actuated contactors 103, each such contactor being controlled by a different key, as the keys marked "1" and "7." The key actuated contactors 103 are mounted on a common pivot bar 105 to which is connected a source of D.C. power, as a battery 107. Each one of the key actuated contactors 103, when depressed, successively touches contacts 109, 111, 113 mounted on a base 114 as shown. That is, contacts 109, 111, 113 are energized successively as the key actuated contactor 103 corresponding to a desired position of the transducer coil assembly 83 is depressed. Predetermined ones of the contacts 109, 111, 113 are connected, respectively, to solenoids 99, 97, 95 through leads 115, 117, 119 so that the solenoids 95, 97, 99 are energized in accordance with the following program:

| | Key #1 | Key #2 | Key #3 | Key #4 | Key #5 | Key #6 | Key #7 |
|---|---|---|---|---|---|---|---|
| Solenoid 95 | | | | X | X | X | X |
| Solenoid 97 | | X | X | | | X | X |
| Solenoid 99 | X | | X | | X | | X |

Figure 4:
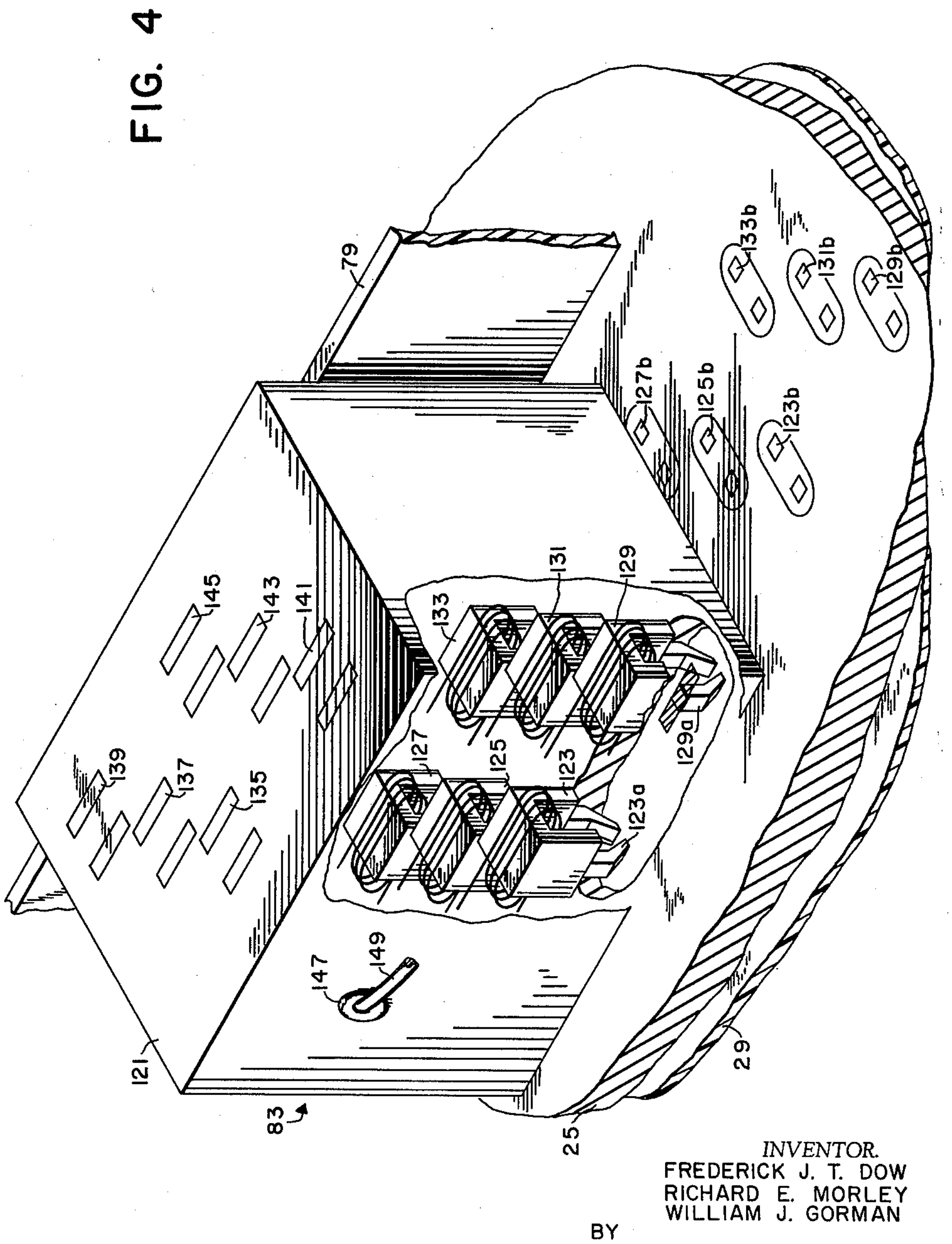
FIG. 4 is a greatly simplified and expanded view, partially in phantom, showing the principle by which selection of closely spaced tracks may be accurately made by a movable track selector.

Referring now to FIG. 4, the principles of construction of the transducer coil assembly 83 may be seen. Before considering FIG. 4 in detail it should be noted that, for simplicity and clarity, duplicating elements have not been shown. For example, the stabilizing plate 23 and the flexible memory disc 37 of FIG. 1 have not been shown in FIG. 4. Further, the number of transducer coils has been reduced as much as possible.

With the foregoing in mind, it may be seen that the transducer coil assembly 83 comprises generally a block 121 of a non-magnetic material, as an epoxy, supporting electromagnets 123, 125, 127, 129, 131, 133 so that the ends of such elements are flush with the lower surface (or project slightly therefrom) of the block 121 and electromagnets 135, 137, 139, 141, 143, 145 so that the ends of such elements are flush with the upper surface (or project slightly therefrom) of the block 121. The electromagnets 123 through 145, which may be fabricated from a conventional sintered ferrite, each carry a conventional coil winding (not numbered) as shown in the lower portion of FIG. 4. The leads from each coil winding are led to a connector 147 embedded in the block 121. A cable 149 is, in turn, connected to the connector 147 to complete the required electrical circuit between each coil and the read/write amplifier 21 of FIG. 1. The vertical dimension of the block 121 (that is, the distance between the surfaces of the block 121 with which the ends of the electromagnets 123 through 145 are flush) is such that a sliding fit exists between the block 121 and the stabilizing plates 23, 25 of FIG. 1. Each of the stabilizing plates 23, 25 supports a plurality of pairs of pole pieces, numbered in FIG. 4 to indicate the particular one of the electromagnets 123 through 133 with which each cooperates. The upper surface of each pole piece is flush with the upper surface of the stabilizing plate 25 while the lower surface (containing the magnet gap) is flush with the lower surface of the stabilizing plate 25. The flexible memory disc 29 in turn is positioned adjacent to the lower surface of the stabilizing plate 25.

It should be noted that, according to the invention, the dimensions of the ends of each of the electromagnets 123 through 133 and the opposing ends of the pole pieces differs, the length of the former being greater than the length of the latter. It is obvious, however, that while such a difference has no effect on the magnetic characteristics of each electromagnet and its associated pair of pole pieces (since it is immaterial where and how the two overlap), the difference does relax the tolerance required of the positioning means for the transducer coil assembly 83. That is, assuming that the transducer coil assembly 83 is to be moved from its illustrated position in FIG. 4 to cooperate with the second set (marked **123*b* through 133*b*) of illustrated pole pieces, the positioning means need only position the transducer coil assembly 83 so that the ends of each pair of pole pieces are overlapped by some portion of the ends of the corresponding electromagnet. To put it another way, if the pole pieces coacting with the electromagnets 123, 129 are evenly spaced in the direction of movement of the transducer coil assembly 83, then the maximum length of the ends of each of the electromagnets, 123, 129 may be equal to the distance between pole pieces (less, of course, the small amount required to accommodate the coils on the electromagnets 123, 129). Consequently, the tolerance in positioning the transducer coil assembly 83 approximately equals plus or minus one half the length of the electromagnets 123, 129. Since the remaining electromagnets 125, 127, 131, 133, in the transducer coil assembly 83 are fixed in position relative to the electromagnets 123, 129, such electromagnets 125, 127, 131, 133 are also correctly positioned when electromagnets 123, 129 are correctly positioned. The fact that the electromagnets 123 through 133 and the pole pieces are disposed along lines which make an acute angle with the direction of movement of the transducer coil assembly 83 results in interlacing of the tracks on the flexible memory disc 29. This interlacing, in turn, means that the spacing between tracks on the flexible memory disc 29 may be less than the tolerance in positioning the transducer coil assembly 83. For example, in one practical recorder wherein 50 electromagnets are assembled in the transducer coil assembly 83 (meaning that 25 of the electromagnets cooperate with pole pieces in one stabilizing plate and 25 cooperate with pole pieces in the other), the spacing between adjacent tracks may be less than .010″, yet the tolerance in positioning of the transducer coil assembly 83** may be in the order of .100″.

It may be seen that the just described embodiment of the invention accomplishes the purposes recited hereinbefore. In particular, the illustrated arrangement of pairs of magnetic cooperating with movable magnetic transducers is highly advantageous. Such a combination in a high capacity memory (wherein a number of modules are stacked on a common shaft) permits random access to be effected rapidly and efficiently. That is, selection of desired tracks (which may be very close to each other) may be accomplished easily and accurately by the mechanical movement of an element of low mass. Further, the capacity of the disclosed memory may be changed easily whenever desired by changing the number of modules. Such a change is made more easily (as compared with prior art memories) because of the magnetic clutch disclosed and the use of flexible disc memory elements.

It will be apparent, however, to those having skill in the art, that many changes in the illustrated embodiment of the invention may be made without departing from our inventive concepts. For example, it is obvious that the number of transducers and the apparatus for positioning the transducers may be changed. It is felt, therefore, that the invention should not be restricted to its disclosed embodiment, but rather should be limited only by the spirit and scope of the appended claims.

What is claimed is:

1. A magnetic memory utilizing a plurality of flexible discs, each supporting a magnetic recording medium, comprising a plurality of modules, each module including:

(a) a pair of annular stabilizing plates fabricated from a non-magnetic material;

(b) a plurality of pairs of magnetic pole pieces embedded in and passing through each of the pair of stabilizing plates;

(c) means for holding the pair of stabilizing plates in a parallel relationship and permitting a fluid to flow therebetween;

(d) a magnetic transducer slidably mounted between the pair of stabilizing plates and adapted to coact, at any time, with but a single pair of the plurality of magnetic pole pieces in each of the stabilizing plates;

(e) a first and a second flexible disc supporting a magnetic recording medium rotatably mounted adjacent, respectively, to the free sides of the pair of stabilizing plates;

(f) means for rotating the first and the second flexible disc to establish a spacing between each such disc and the corresponding stabilizing plate; and, (g) means for positioning and energizing the magnetic transducer to record, through a single pair of magnetic pole pieces, information on the first and the second flexible disc.

2. A magnetic memory as in claim 1 wherein the means for rotatably mounting the first and the second flexible disc, comprises:

(a) a clamping assembly rotatably mounted between the pair of annular stabilizing plates to hold the first and the second flexible discs;

(b) a shaft mounted centrally of the clamping assembly;

(c) a magnetic clutch coacting between the shaft and the clamping assembly; and, (d) means for rotating the shaft to cause the first and second flexible discs to rotate in response to rotation of the clamping assembly in response to rotation of the magnetic clutch.

3. A magnetic memory as in claim 2 wherein:

(a) the plurality of pairs of magnetic pole pieces are divided into an integral number of similar groups encompassing a sector of the stabilizing plates, each one of the pairs of magnetic pole pieces in each such group being at a different radial and circumferential position; and, (b) the magnetic transducer includes a plurality of independently actuable coils and magnetic coupling units, corresponding in number to the number of pairs of magnetic pole pieces in each such group, the width of each of the magnetic coupling units being greater than the width of the magnetic pole pieces and less than one half the radial distance between corresponding magnetic pole pieces in adjacent ones of the groups thereof.

4. A magnetic memory as in claim 3 wherein the means for positioning and energizing the magnetic transducer includes:

(a) means for moving the magnetic transducer only to preselected discrete positions corresponding to the position of the position of the groups of magnetic pole pieces, the tolerance in the precision of such movement being equal to one half the width of the magnetic coupling units.

5. A magnetic transducer adapted to record information on any one of a plurality of tracks on a disc-shaped memory medium of a magnetic memory, comprising:

(a) a first plurality of pairs of similar magnetic pole pieces equally spaced radially of the disc-shaped memory medium and in operative relationship thereto, the distance between each successive pair of such magnetic pole pieces being greater than the width of each of such magnetic pole pieces;

(b) a magnetic coupling element adapted to link the free ends of the pole pieces of any pair of similar magnetic pole pieces, the width of the magnetic coupling element being greater than the width of each of the magnetic pole pieces and less than one-half the distance therebetween;

(c) an actuating coil disposed around the magnetic coupling element; and (d) means for moving the magnetic coupling element and the actuating coil radially of the disc-shaped memory medium to cause the magnetic coupling element to coact with, at any time, a single pair of the plurality of pairs of similar magnetic pole pieces.

6. A magnetic transducer as in claim 5 having, additionally, (a) a second plurality of pairs of similar magnetic pole pieces disposed radially between the individual ones of the magnetic pole pieces of the first plurality thereof and on a radius offset from the radius on which the magnetic pole pieces of the first plurality are mounted;

(b) a second magnetic coupling unit movable with the first magnetic coupling unit and identical thereto except being adapted to link the free ends of any pair of the second plurality of pairs of magnetic pole pieces; and, (c) an actuating coil disposed around the second magnetic coupling unit.

No references cited.